(No Model.) 2 Sheets—Sheet 2.
C. C. PECK.
PROCESS OF MANUFACTURING SALT.
No. 426,141. Patented Apr. 22, 1890.
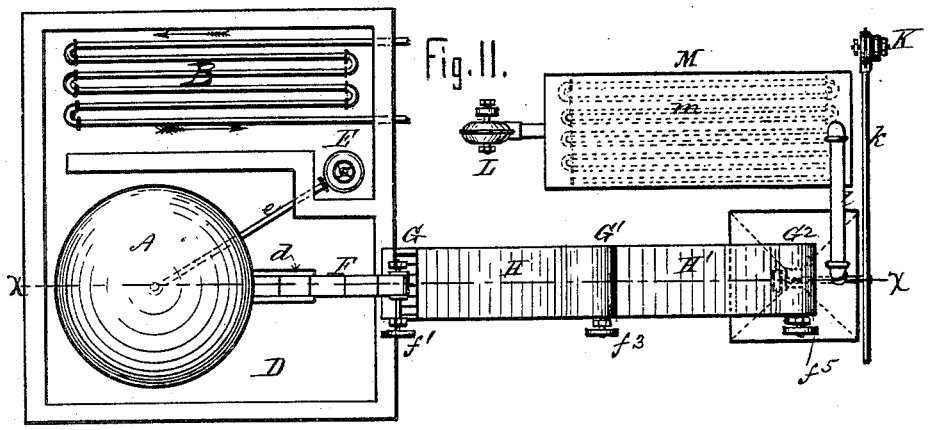
Fig. II.
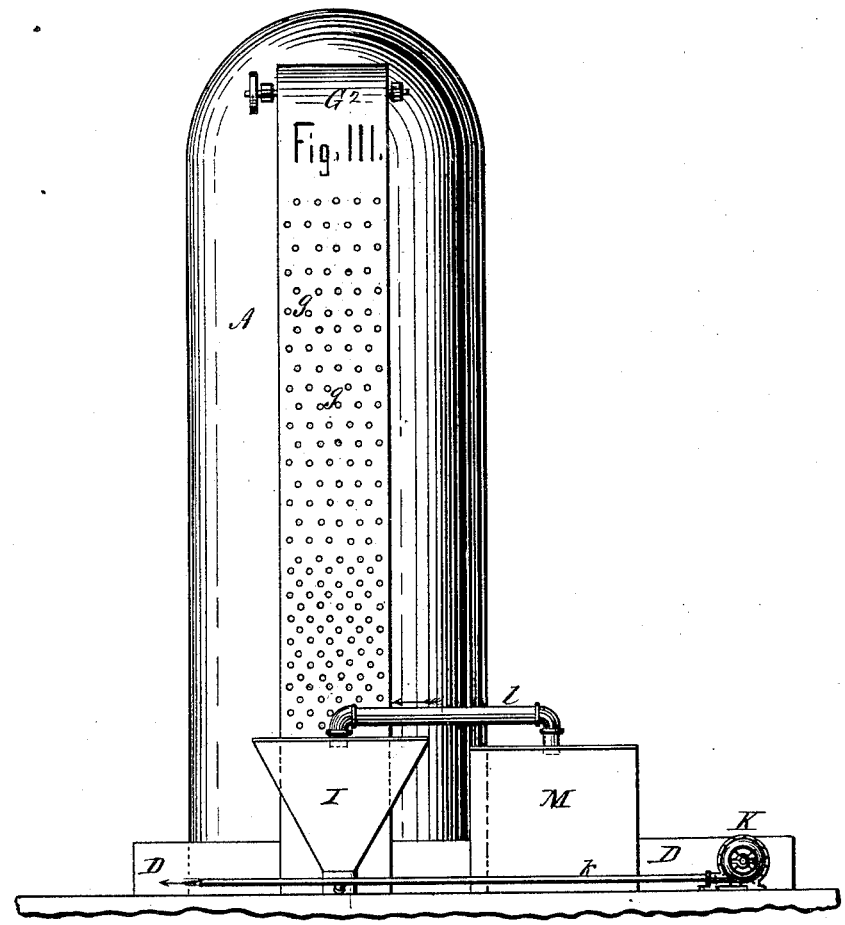
Fig. III.
WITNESSES:
Geo. W. Miatt
D. W. Gardner
INVENTOR:
Cassius C. Peck

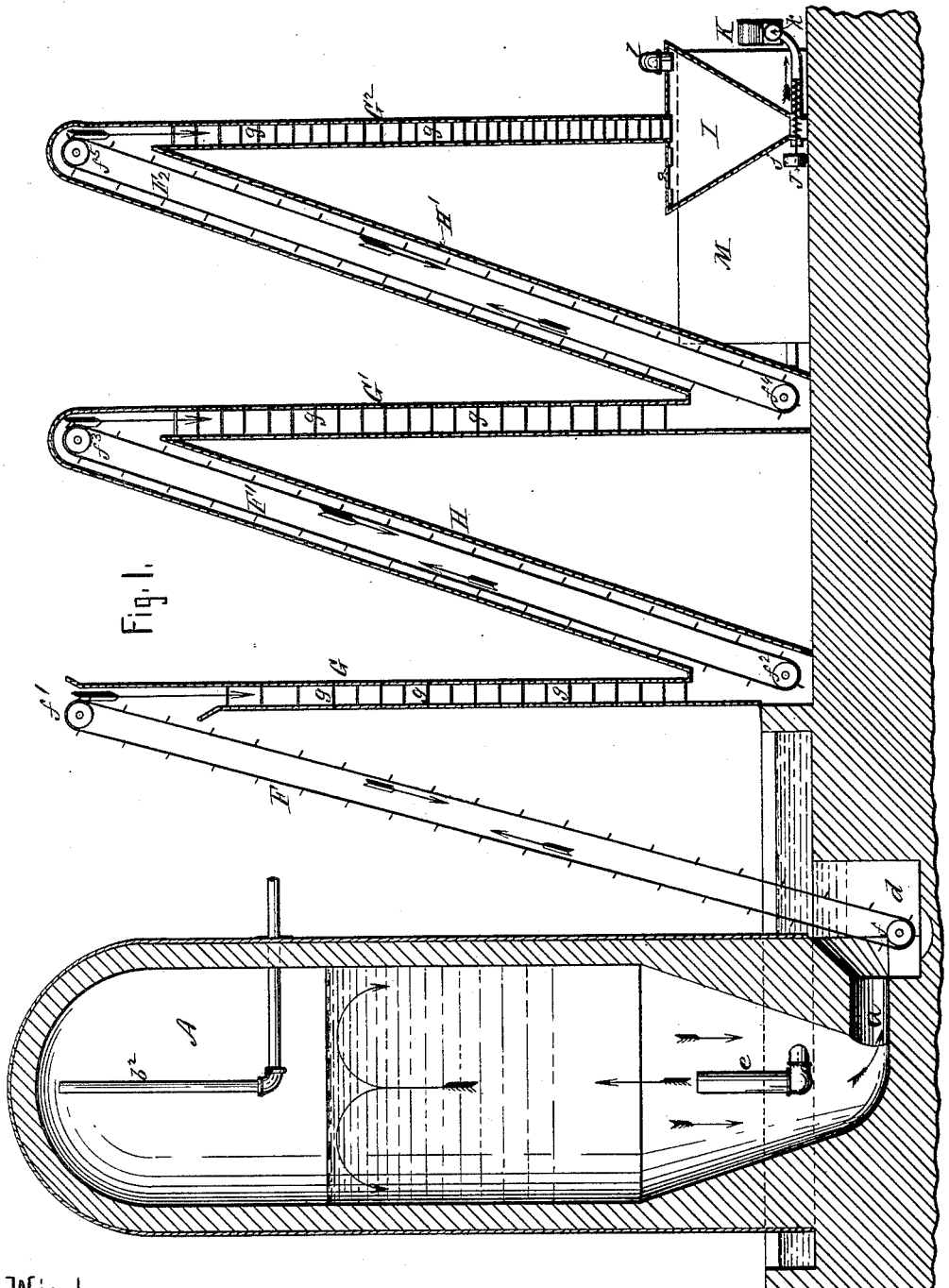

UNITED STATES PATENT OFFICE.

CASSIUS C. PECK, OF NEW YORK, N. Y.

PROCESS OF MANUFACTURING SALT.

SPECIFICATION forming part of Letters Patent No. 426,141, dated April 22, 1890.

Application filed April 6, 1889. Serial No. 306,239. (No model.)

*To all whom it may concern:*

Be it known that I, CASSIUS C. PECK, a citizen of the United States, residing in the city, county, and State of New York, have invented a certain new and Improved Process for Manufacturing Salt, of which the following is a specification.

My invention relates to the method of making salt from brine by evaporation; and it consists in a continuous process in which the several features are the separation of salt from brine in apparatus so arranged that the heating-surface can be cleansed without interruption of the process of evaporation, automatically removing salt from the evaporator, and drying the salt while conveying it to any suitable point for bolting, storage, or shipment.

Salt is usually made by evaporating brine in shallow pans or else in kettles with fire underneath, or in shallow wooden tanks, called "grainers," which are heated by steam-pipes, also in a few instances in steam-jacketed kettles. In all these cases the salt as precipitated from the hot brine has to be lifted out of the evaporating apparatus by hand, placed in carts, and wheeled to draining-bins, in which latter it remains for at least fourteen days before being sufficiently dry to barrel and ship as common salt. The labor involved in excavating the salt from these bins is considerable, and if it is to be made into "dairy" or "table" salt it has to be wheeled to the drying apparatus and delivered into it. This latter usually consists of a large horizontally-set steam or fire heated iron drum, in which the salt is tumbled, entering at one end of the drum and passing out at the other end.

The several processes of evaporation, draining, artificial drying, and handling being conducted separately and independently involve the expenditure of much time and labor, which I save by a continuous system, which conducts the salt through the different required steps automatically.

I am aware that certain devices have been patented for automatically discharging salt from evaporating apparatus, also for mechanically draining salt in centrifugal machines, such as are employed for draining sugar; but I am not aware that the several steps involved in making salt, as herein described, have ever heretofore been combined in such manner as to make the whole operation continuous and automatic.

As incidental features of my continuous process I show and describe herein the surface for heating the brine as situated outside of the evaporating apparatus, as well as means for establishing a rapid circulation of brine between said heating-surface and the evaporating apparatus. Both these features are set forth in a concurrent application, Serial No. 327,032, filed October 14, 1889, which is a subdivision of the present one, and I do not seek to claim said features independently herein. The effect of this arrangement is not only to make the heating-surface accessible at all times for cleaning without interruption of the process of evaporation, but also to cause the deposit of salt precipitated by evaporation to occur in the evaporating apparatus and removed from the heating-surface, so that the latter is not clogged and rendered inefficient by such deposit, as is the case in other kinds of evaporating apparatus, while the rapid forced circulation of the brine maintains said brine at nearly the same temperature in the evaporating apparatus as in the pan or tank, where it is in contact with the heating-coil, and by causing the greatest possible amount of heat to be conveyed away from the heating-coil gives to this its maximum efficiency and augments the amount of evaporation which can ordinarily be effected with a given amount of heating-surface. The forced circulation of brine also collects the solid products of evaporation in the evaporating apparatus and removes and delivers said products from the evaporating-chamber into a well or basin into position convenient for removal by ordinary conveying mechanism.

An important and distinguishing feature of my continuous process of manufacture consists in conveying the wet salt in such manner against an oppositely-moving current of heated air that the salt shall become dried on its passage from the evaporating apparatus to the bolting or screening apparatus or storage-room.

In an application, Serial No. 306,238, for Letters Patent, filed April 6, 1889, concurrently with this application, I show the same evaporating apparatus as that used in the present application, illustrating the operation of my improved process; but I do not seek to cover herein the mechanical construction of such apparatus.

In the accompanying drawings I show apparatus suitable for carrying out my process practically, although I do not wish to confine myself to the use of any special form or construction of apparatus, since it is obvious that various modifications may be made therein without deviating from the essential features of my invention.

In the drawings, Figure I is a vertical central section of apparatus embodying the various steps in my process of making salt. Fig. II is a plan view of same. Fig. III is an elevation at right angles to Figs. I and II.

A is a vacuum-chamber, in which salt is separated from brine by evaporation. The vacuum-chamber is set in a tank which is provided with a basin or pocket $d$ at the base of the chamber, into which the belt or chain of a conveyer enters, the said belt or chain being carried around pulley $f$ and being driven by pulley $f'$.

G G' G² are shafts or chutes, made preferably of wood, and provided with numerous cross-rods, of wood or metal $g$, for dividing the salt and checking its fall.

F' and F² are conveyers, constructed and operated in manner similar to conveyer F, but differ from the latter in being tightly inclosed in wooden cases H H'.

I is a hopper, into which the dried salt is received previous to being delivered by screw conveyer J into blast-pipe $k$, which is connected with the fan-blower K. Another blower L is employed for forcing air through the steam-pipe coil $m$ in box M, and through pipe $l$ into hopper I. From the tightly-inclosed hopper the heated air proceeds upward through shaft G², down through the case H' of elevator F², up through shaft G', down through the case H' of elevator F', and, finally, upward through shaft G into the atmosphere.

Arrows feathered on both sides indicate the circulation of brine, the large arrows feathered on one side only the movement of salt, and the arrows without any feathering give the direction in which the elevator belts or chains move.

The operation is as follows: Brine in tank D is heated by steam-pipe coil B and forced by vertically-set centrifugal pump E into vacuum-chamber A. A vacuum is formed in this chamber by action of a vacuum-pump through connecting-pipe $b^2$. The liquid-level in chamber A corresponds with the degree of vacuum maintained within the chamber. The action of centrifugal pump E has little influence on said level, for the brine is free to flow out through opening $a$ at the bottom of chamber A, and will flow out as soon as the level is raised by the centrifugal pump above that due to the existing vacuum. The pump E is intended to be of sufficient size and be run at sufficient speed that a rapid circulation shall be maintained between chamber A and heating-coil B, to the end that the temperature of brine in chamber A may be kept at nearly the temperature of that in contact with heater-coil B, so as to make evaporation in chamber A as rapid as possible and to make the outflowing current so rapid that it shall sweep all salt precipitated from the boiling brine down the converging sides of the chamber and out through opening $a$ into basin $d$. This basin having a comparatively large area, the current of brine becomes correspondingly slow, which allows the salt to settle out of the brine and be taken up by conveyer F, which elevates and delivers it into the top of shaft G. The elevator is driven at as slow a speed as is consistent with taking up the salt as fast as made. The brine drains back into tank D during the process of elevation, and when the salt is discharged into shaft G it is still in a very wet condition. As the salt falls into the shaft it strikes upon the cross-rods $g$, which are set as near together as possible without being liable to bridge over from one rod to another with salt, and thus block up the shaft. The cross-rods may be made of non-corrosive metal or of hard wood, such as hickory. The rods are preferably set in parallel but not vertical rows, each horizontal row "breaking joints" with the row above and the row below it, so that the salt shall fall from one rod to another, to the end that the mass may become thoroughly divided, and all the crystals separately exposed to the action of the current of hot air ascending through the shaft. On reaching the bottom of shaft G the salt is taken up by conveyer F' and elevated and delivered into the top of shaft G', which is constructed similarly to shaft G, only that the cross-rods are set nearer together. In falling through shaft G' the salt loses a good deal of moisture by contact with the ascending current of hot air. The air-current is given as great a capacity for moisture as possible by first forcing it, by means of blower L, through to the coil of steam-pipes $m$, contained in box M. In falling through shaft G the salt becomes so far dried that when lifted from the bottom of said shaft by conveyer F² and delivered into the top of shaft G² it has much less tendency than previously to cling together in a mass. The cross-rods $g$ can therefore be set closer together in shaft F² than in shaft F', without danger of clogging with salt; also, the lower portion of each of the shafts F F' F² may have the cross-rods $g$ set closer, both vertically and horizontally, than at the tops, but it is more especially desirable to have them so set in the case of shaft G², as the crystals of salt move easily among themselves as they become nearly dry.

The elevation, Fig. III, shows the position of the cross-rod in shaft G². It is considered that the salt will be sufficiently freed of moisture when it has fallen through shaft $G^2$ into hopper I.

More or less drying-shafts may be employed, depending upon the degree of dryness required, the height and other dimensions of the shafts, and the arrangement of the cross-rods; and I therefore do not confine myself to the use of any specific number of drying-shafts.

The sides of hopper I are made sufficiently sloping, so that all salt falling into it from shaft $G^2$ shall slide down to the center and into screw conveyer J, which is driven by pulley $j$. This conveyer forces the salt into pipe $k$, in which is a current of air maintained by fan-blower K, which current is sufficiently strong to carry the dry salt to any desired point of delivery.

When it is desirable to carry the drying process farther than is done in drying-shafts G G' $G^2$, the blast from blower K may be heated; but the drying can be more economically done in the shafts.

In order that the air-blast conveyer may operate successfully, it is necessary that a seal of salt be constantly maintained in the pipe of screw conveyer J, as otherwise the pressure of air in pipe $k$ would force air out through the screw-conveyer pipe. The requisite seal is obtained by continuing the screw-conveyer pipe a sufficient distance beyond the delivery end of the worm or screw to make sure that this portion of the pipe shall be always filled with salt, and it will be more easily kept filled, and the pipe may be made relatively shorter if it is given an upward turn in joining pipe $k$.

It is obvious that a suction or exhaust current of air may be employed as the equivalent of the screw conveyer and forced blast for drawing the salt out of hopper I and to any desired point.

What I claim as my invention, and desire to secure by Letters Patent, is—

The process of manufacturing salt continuously, consisting in separating the salt from the brine by evaporation, removing the salt from the evaporator automatically, and drying it in the process of removal by keeping it in an agitated state and passing a current of air through it, the air and the salt moving in opposite directions, substantially in the manner herein set forth.

CASSIUS C. PECK.

Witnesses:
L. B. PECK,
W. L. DE GRAW.